United States Patent [19]
Birdwell

[11] 4,388,910
[45] Jun. 21, 1983

[54] INTAKE EXPANSION CHAMBER APPARATUS FOR INTERNAL COMBUSTION ENGINES

[76] Inventor: Glenn E. Birdwell, 1302 Wright Rd., Alcoa, Tenn. 37901

[21] Appl. No.: 276,000

[22] Filed: Jun. 22, 1981

[51] Int. Cl.³ .................................. F02M 31/00
[52] U.S. Cl. ........................ 123/547; 123/545; 123/546; 261/144; 165/52
[58] Field of Search ............ 123/546, 523, 547, 545; 261/144, 145, DIG. 6; 165/52, 134, 114; 48/180 H

[56] References Cited

U.S. PATENT DOCUMENTS

| | | | |
|---|---|---|---|
| 817,941 | 4/1906 | Stute | 261/DIG. 6 |
| 2,070,189 | 2/1937 | Webster | 165/52 |
| 3,762,385 | 10/1973 | Hollnagel | 261/144 |
| 4,083,340 | 4/1978 | Furr | 165/52 |
| 4,100,899 | 7/1978 | Chilton | 123/546 |
| 4,312,318 | 1/1982 | Davis | 123/546 |

*Primary Examiner*—Ronald H. Lazarus
*Attorney, Agent, or Firm*—Pitts, Ruderman & Kesterson

[57] ABSTRACT

An intake expansion chamber apparatus (10) for internal combustion engines is disclosed which preheats and expands the vaporized fuel/air mixture as the mixture flows between the carburetor and the combustion chamber. The apparatus includes an expansion chamber section (18) through which the fuel/air mixture flows between an inlet (20) connected in fluid communication with the intake manifold and an outlet (26) joined in fluid communication with the intake manifold at a location downstream from the outlet. The fuel/air mixture is heated during its passage through the expansion chamber by a heat transfer surface (30) to improve the vaporization and to more completely combust the hydrocarbons upon ignition. A safety valve (46) is provided to release pressure built up within the expansion chamber as during an engine backfire.

3 Claims, 6 Drawing Figures

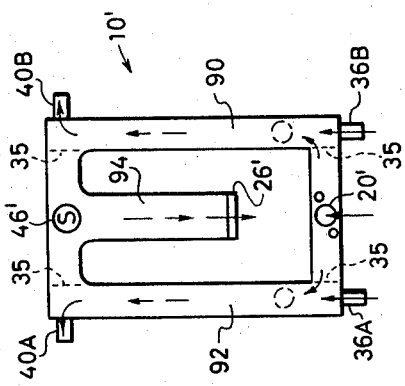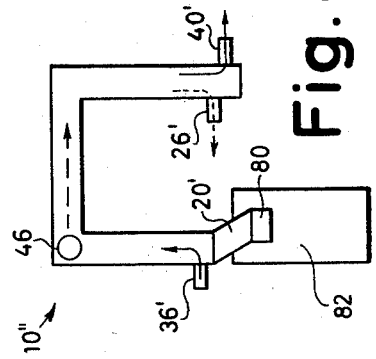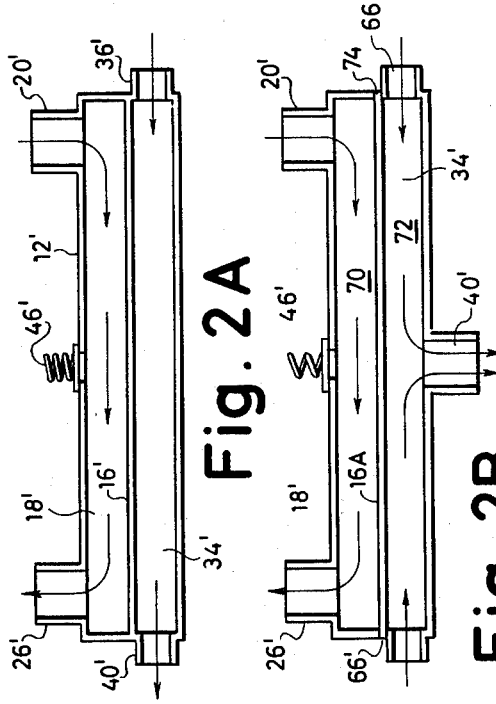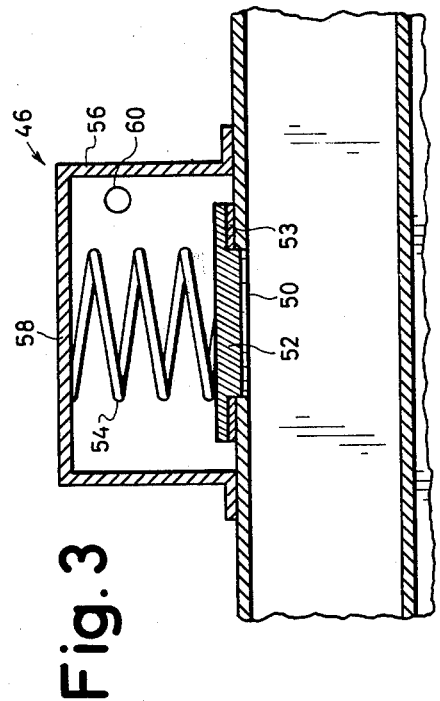

4,388,910

INTAKE EXPANSION CHAMBER APPARATUS FOR INTERNAL COMBUSTION ENGINES

DESCRIPTION

1. Technical Field

This invention relates generally to internal combustion engines and more particularly concerns an expansion chamber for preheating and homogenizing the fuel/air mixture prior to its introduction into the combustion chamber.

2. Background Art

Various types of fuel/air mixture heating devices for internal combustion engines have been heretofore known. These devices typically are available in various sizes and incorporate various methods for transferring heat to the fuel/air mixture. Examples of known devices generally related to this art are disclosed in the following U.S. Pat. Nos. 3,892,211; 3,911,881; 3,963,012; and 4,167,165.

Certain of the known prior art devices are expensive to manufacture, particularly since they incorporate numerous parts and are labor intensive. For these reasons amoung others, expansion chambers for preheating the fuel/air mixture are not readily available on the market.

Since it is desirable that a fuel/air mixture preheating apparatus be both inexpensive to manufacture and include relatively few parts, it is an object of the present invention to provide an expansion chamber apparatus which is adaptable for use in both the new product and retrofit markets and which is inexpensive to manufacture.

Another object of the present invention is to provide an intake expansion chamber apparatus which can be easily maintained and readily installed on existing internal combustion engines of various types and which incorporate various numbers of cylinders. Still, a further object of the present invention is to provide an intake expansion chamber apparatus which includes a safety valve for releasing pressure from the expansion chamber as may be occassioned during an engine backfire.

DISCLOSURE OF THE INVENTION

Other objects and advantages of the present invention will become apparent upon reading the detailed description of the apparatus which includes a first wall which defines an enclosure and a further wall which is disposed within the enclosure and serves to partition the enclosure into an expansion chamber section and a heating chamber section. The expansion chamber section defines a heating chamber which includes an exhaust intake and an exhaust outlet which are connected with the exhaust system of the internal combustion engine. The exhaust gases of the engine serve to heat the fuel/air mixture as the mixture passes through the expansion chamber. In this construction, the further wall defines a heat transfer surface having a preselected area against which the fuel/air mixture strikes during its movement from the carburetor to the combustion chamber. A safety valve provides selective fluid communication between the expansion chamber and the ambient atmosphere to release pressure within the heating chamber when the pressure of the gases exceeds a preselected value as during an engine backfire.

BRIEF DESCRIPTION OF THE DRAWINGS

The above-mentioned features of the present invention will become more clearly understood from the consideration of the following description taken in conjunction with the accompanying drawings in which:

FIG. 2A and 2B are sectional side elevation views of exemplary embodiments of intake expansion chamber apparatuses constructed in accordance with the invention.

FIG. 3 illustrates a safety release valve joined in fluid communication with a selectively opened and closed port through which pressurized gases pass from the expansion chamber for purposes of being vented.

FIG. 4A illustrates an intake expansion chamber apparatus for use in conjunction with internal combustion engines incorporating eight cylinders.

FIG. 4B illustrates an embodiment of the intake expansion chamber apparatus for use in conjunction with four and/or six cylinder combustion engines.

BEST MODE FOR CARRYING OUT THE INVENTION

Figure 1:
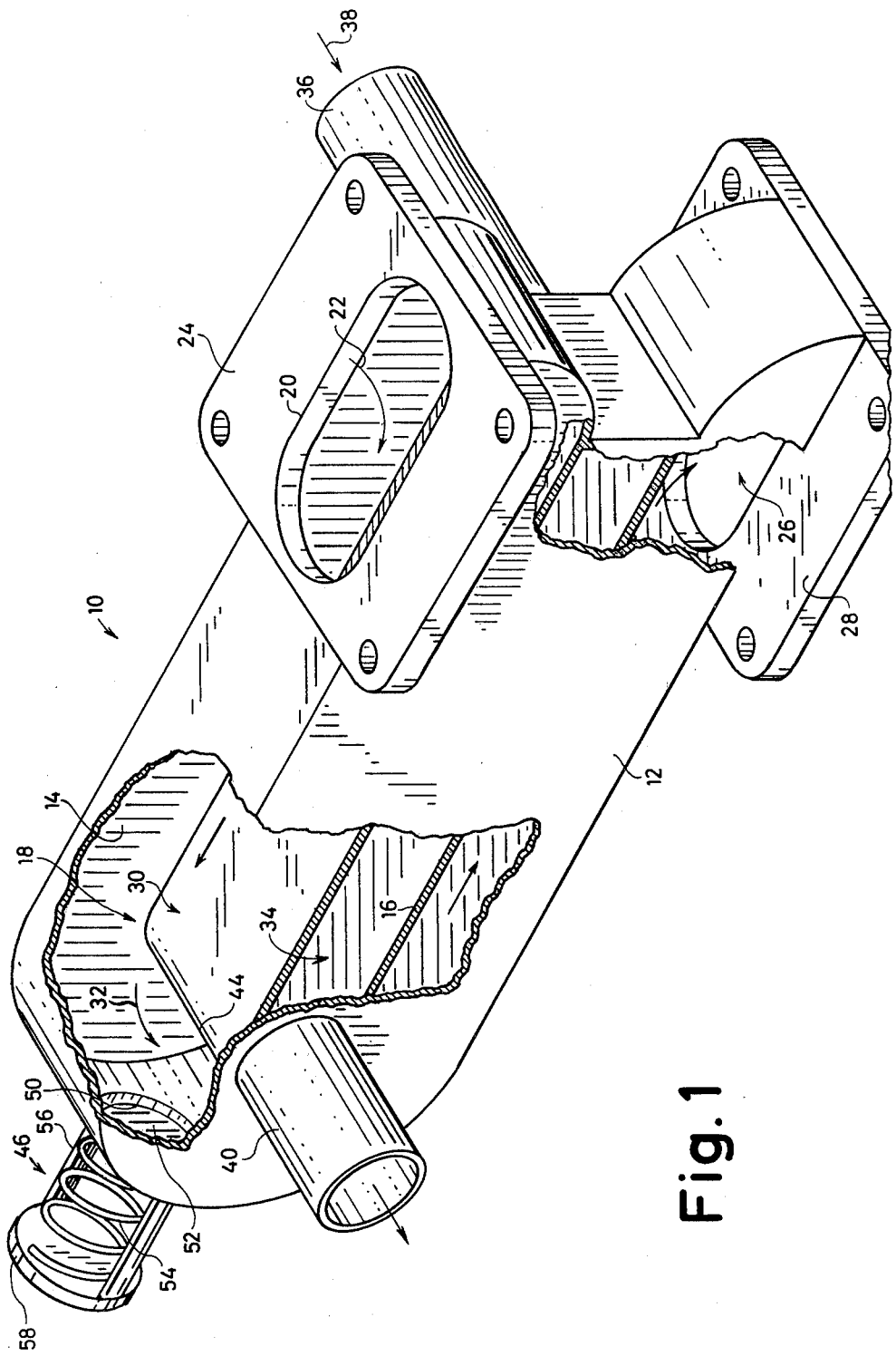
FIG. 1 is a pictorial view of an intake expansion chamber apparatus constructed in accordance with various features of the invention, and in which certain portions of the wall are broken away for illustrative purposes.

Referring now to the drawings, an intake expansion chamber apparatus constructed in accordance with features of the invention is illustrated generally at 10 in FIG. 1. This apparatus is designed for use in connection with internal combustion engines and preheats and expands the vaporized fuel/air mixture as the mixture flows between the carburetor and combustion chamber or chambers through a conduit such as the intake manifold. Heating is accomplished by utilization of the waste heat discharged from the exhaust system of the internal combustion engine. More specifically, the illustrated intake expansion chamber apparatus includes a first wall 12 fabricated from a heat resistive material such as a steel, iron, or the like. This wall defines an enclosure 14 which can assume various geometries and which in FIG. 1 is substantially rectangular in cross-sectional outline.

Wall 16 is disposed within the enclosure 14 and is fabricated from a rigid heat resistive material such as steel. This wall serves to partition the enclosure 14 into an expansion chamber section 18 which defines an expansion chamber which is interposed between the carburetor (not shown) and the combustion chamber or chambers (not shown) of an internal combustion engine. The fuel/air mixture passes into the expansion chamber through an inlet 20 in the direction of the arrow 22. As illustrated in FIG. 1, a suitable mounting bracket 24 is provided for supporting the carburetor.

The fuel/air mixture passes from the inlet 20 through the expansion chamber and exits the expansion chamber through an outlet 26 which is joined in fluid communication with the intake manifold by the bracket 28 in the illustrated embodiment at a location downstream from the fuel/air mixture inlet.

As the fuel/air mixture passes through the expansion chamber, it contacts a heat transfer surface generally indicated at 30 which is defined by the wall 16. Responsively, the fuel/air mixture is heated as it passes through the expansion chamber between the inlet 20 and the outlet 26.

As illustrated in FIG. 1, the expansion chamber 18 has a first leg having a first end portion which communicates with the fuel/air mixture inlet 20 and a further end portion positioned proximate the arrow 32 indicating the direction of the flow of the fuel/air mixture. This chamber also includes a further leg which is joined in fluid communication at one of its end portions with the outlet 26 and interconnects with the further end portion of the first leg at the juncture proximate the location of the arrow 32. It will be noted that these legs are disposed substantially parallel and are substantially coextensive in the illustrated embodiment such that the flow of the fuel/air mixture defines a "U" as it passes over the wall 16 which defines a heat transfer surface 30.

The wall 16 partitions the enclosure 14 into a heating chamber section generally indicated at 34. This heating chamber section defines a heating chamber and includes an exhaust intake 36 which is connnected in fluid communication with the exhaust system of the internal combustion engine. The heated exhaust gases flow through the intake 36 in the direction of the arrow 38, through the heating chamber and exit the heating chamber through the outlet 40 which is joined in fluid communication with the exhaust system at the location downstream from the exhaust intake. The heated gases from the exhaust system serve to heat the wall 16 which serves as the heat transfer surface. This heating operation enhances the vaporization and causes the hydrocarbons to be more completely combusted upon the preheated fuel/air mixture being introduced into the combustion chamber or chambers of the internal combustion engine.

In the embodiment illustrated in FIG. 1, the heating chamber is interposed between the first leg of the expansion chamber and the further leg of the expansion chamber and defines an end portion 44 which is spaced from the juncture at which the first leg and the further leg of the expansion chamber are joined in fluid communication.

One important feature of the present invention is to provide means for releasing pressure built up within the expansion chamber during an engine backfire. In this connection, a safety valve generally indicated at 46 is provided. The illustrated safety valve provides selective fluid communication between the expansion chamber and the ambient atmosphere to release excessive presurized gases from the heating chamber. In this connection, the wall 12 defines an expansion chamber section port 50. This port 50 is selectively opened and closed by the closure member 52 which is proportioned for covering the port. The closure member is biased by the spring member 54 towards its closed position over the expansion chamber section port. A housing member 56 which defines a substantially U-shaped cross-sectional outline in FIG. 3 serves to mount the spring and in this connection engages the end portion 58 thereof. The opposite end portion of the spring engages the closure member biasing it towards its closed position. This compression spring member 54 is selected such that it is actuated upon by the pressure within the heating chamber reaching preselected value. Gases passing through the port 50 exit the housing 56 through the opening 60 which allows the gases to be vented to the ambient atmosphere. A seal 53 is carried in the recessed shoulder proximate the perimeter of the member 52.

In another embodiment of the invention illustrated in FIG. 2A, the wall 12' defines an enclosure having a substantially rectangular cross-sectional outline which is partitioned by the wall 16', comprising a substantially rectangular plate which is planar and interconnected at its perimeter with the internal surface of the wall 12' defining the enclosure. In this and subsequent embodiments, primed numerals refer to like components and-/or features of the previously described embodiments. Thus, the wall 16' partitions the enclosure into a heating chamber section 34' and an expansion chamber section 18'. In this embodiment it will be recognized that the fuel/air mixture passes through the expansion chamber in the direction of the illustrated arrows and the exhaust gases which are heated, pass through the heating chamber section in the direction of the illustrated arrows. Thus, only one surface of the wall 16' serves as a heat transfer surface. In this embodiment, the end portion of the wall 16', which serves as the heat transfer surface, nearest the inlet 20' will be hotter than the end portion of the wall 16' nearest the outlet 26'. Therefore, the vaporization effect will be somewhat reduced nearer the outlet 26'. It has been found that for an automobile the heat transfer plate needs to be approximately 1 inch long for each 6 inches per hour traveled or approximately 15-20 miles long for the standard car to accomplish a desired vaporization.

A further embodiment of the invention is illustrated in FIG. 2B. In this embodiment, normally used in V-eight internal combustion engines such as the M-shaped configuration illustrated in FIG. 4A, the exhaust gases flow into the heating chamber from opposite directions through the cooperating pair of inlet ports 66 and 66'. These gases exit the heating chamber through a single outlet port 26'. Since the exhaust gases are introduced into the heating chamber at its opposite ends, the heat transfer surface is more evenly heated.

The embodiment illustrated in FIG. 4A depicts an apparatus 10' constructed in accordance with various features of the present invention which is designed for use with an internal bomsution engine such as a V-eight engine on an automobile. In this embodiment, the flow of the fuel/air mixture is depicted by the dashed arrows and the flow of the exhaust gases is depicted by the solid arrows. It will be recognized that the apparatus enclosure is partitioned such that fuel/air mixture flows through the expansion chamber 18' above the heating chamber through which the exhaust gases flow. More specifically, the fuel/air mixture flows through the apparatus expansion chamber between the inlet 20', whih communicates with the engine carburetor (not shown), through the apparatus branches 90 and 92, in the direction of the dashed arrows, which direct the mixture into the output branch 94 where it is discharged through the outlet branch 94 where it is discharged through the outlet 26' into the intake manifold. Similarly, the exhaust gases enter the heating chambers through a pair of intakes 36A and 36B, and exit these chambers through outlets 40A and 40B, respectively. It will be noted that the heating chamber sections in the FIG. 4A embodiment are substantially parallel, substantially coextensive and terminate at the location of the walls for partitions 35.

The embodiment illustrated in FIG. 4B depicts the apparatus 10" of the present invention used in connection with a small internal combustion engine such as used in conjunction with a lawn mower. The carburetor is depicted diagramatically at 80 and the gasoline tank is illustrated at 82. The dashed arrows in FIG. 4B depict the flow of the fuel/air mixture, and the solid arrows depict the flow of the exhaust gases. It will be recognized that these flows, that is the exhaust gases and the fuel/air mixture, will be on different levels, one above the other as illustrated in FIG. 2A and 2B, with the fuel/air mixture flowing above the exhaust gases. More specifically, the fuel/air mixture flows through the apparatus expansion chamber between the inlet 20' and the outlet 26' and is heated by the heat transfer surface or wall separating the expansion chamber from the heating chamber. This mixture is vented to the ambient atmosphere through the safety valve 46'. Similarly, the exhuast gases flow through the apparatus heating chamber between the intake 36' and the outlet 40', thereby heating the heat transfer surface.

It will be recognized that the configuration of the apparatus can assume any number of geometric shapes to accommodate a particular type of internal combustion engine.

For purposes of reducing manufacturing costs, one embodiment of the invention is fabricated from a pair of mating pans 70 and 72 (See FIG. 2B), which have a similar cross-sectional outline. Each of these pans define an opening defined by its respective walls, and flanges 74 which extend about the perimeter of the opening. These mating flanges of the pans 70 and 72 can be bolted together for purposes of joining the two pans together to form the enclosure. The enclosure is partitioned by the wall 16A in FIG. 2B, to form the upper heating chamber section and the lower expansion chamber section. The wall 16A is a substantially planar plate interposed between the pans 70 and 72 prior to securing the pans together as with bolts. In this connection, the perimeter of the pan flanges and the perimeter of the plate 16A are provided with registering openings for receiving shafts of bolts (not shown). Of course, the pans and plate can be joined by other means such as welding. Moreover, it will be recognized that the various inlets and outlets for the heating chamber and expansion chamber section can be placed as necessary or desired to accommodate the engine configuration.

From the foregoing detailed description, it will be recognized that an improved intake expansion chamber apparatus for internal combustion engines has been described and illustrated which incorporates various improvements over the known prior art. For example, the present apparatus is designed to be inexpensive to manufacture and includes a reduced number of parts, relative to known prior art such that it is easy to maintain. Moreover, the present invention can be readily installed without the necessity of a skilled mechanic. This intake expansion chamber apparatus is also readily adaptable for internal combustion engines of various types and sizes. For example, in one embodiment having a substantially M-shaped cross-sectional outline it can be used with V-eight engines, and in another embodiment which has a substantially U-shaped cross-sectional outline it is designed for being used with six cylinder type engines. This apparatus can also be installed on smaller internal combustion engines such as the engines for a lawn mower.

While a preferred embodiment has been shown and described, it will be understood that there is no intent to limit the invention by such disclosure, but rather it is intended to cover all modifications and alternate constructions falling within the spirit and scope of the invention as described in the appended claims.

I claim:

1. An intake expansion chamber apparatus for internal combustion engines which preheats and expands the vaporized fuel/air mixture as said mixture flows between the carburetor and combustion chamber through a conduit such as the intake manifold, and wherein the heat is supplied to the fuel/air mixture by the exhaust system of said internal combustion engine, said apparatus comprising:

a wall defining an enclosure;

a further wall disposed at least partially within said enclosure and serving to partition said enclosure into an expansion chamber section and a heating chamber section, said expansion chamber section having a first leg which has a first end portion which communicates with said fuel/air mixture inlet and a further end portion, and a second leg which has a first end portion which communicates with said fuel/air mixture outlet and a further end portion, the further end portions of said first leg and said further leg being joined in fluid communication such that said first leg and said further leg are disposed substantially parallel with each other and substantially coextensive, said heating chamber section including an exhaust intake joined in fluid communication with said exhaust system of said internal combustion engine, and an exhaust outlet joined in fluid communication with said exhaust system of said internal combustion engine at a location downstream from said exhaust intake, whereby heated gases from said exhaust system flow through said heating chamber section and heat said further wall to form a heat transfer surface;

said expansion chamber section being interposed in the intake manifold of said internal combustion engine between said carburetor and said combustion chamber, and including a fuel/air mixture inlet connected in fluid communication with said intake manifold, and a fuel/air mixture outlet joined in fluid communication with said intake manifold at a location downstream from said fuel/air mixture inlet, said expansion chamber section serving to direct said fuel/air mixture over said heat transfer surface defined by said further wall for purposes of heating and expanding said mixture prior to its introduction into a combustion chamber of said internal combustion engine, such that vaporization is improved and hydrocarbons are more completely combusted; and a safety valve providing selective fluid communication between said expansion chamber section and the ambient atmosphere, said safety valve disposed proximate the juncture at which said further end portion of said first leg and said further end portion of said second leg are joined in fluid communication, said safety valve serving to release pressure within said expansion chamber section when said pressure exceeds a preselected value as during an engine backfire.

2. The intake expansion chamber of claim 1 wherein said heating chamber is interposed between said first leg of said expansion chamber and said further leg of said expansion chamber, and defines one end portion which is spaced from said juncture at which said first leg and said further leg of the expansion chamber are joined in fluid communication.

3. An intake expansion chamber apparatus for internal combustion engines which preheats and expands the vaporized fuel/air mixture as said mixture flows between the carburetor and the combustion chamber through a conduit such as the intake manifold, and wherein the heat is supplied to the fuel/air mixture by the exhaust system of said internal combustion engine, said apparatus comprising:

wall means defining an enclosure, said wall means comprising a pair of mating pans having a similar cross-sectional outline, each of said pans defining an opening, and each of said pans including flanges proximate said opening of each respected pan, said flanges mating for purposes of joining said pans together, a further wall means comprising a substantially planar plate interposed between said pans for purposes of partitioning said enclosure defind by joining said pans into an expansion chamber section and a heating chamber section, said plate serving as a heat transfer surface, said heating chamber section defining a heating chamber, said heating chamber section including at least two exhaust intakes joined in fluid communication with said exhaust system of said internal combustion engine, and an exhaust outlet joined in fluid communication with said exhaust system of said internal combustion engine at a location downstream from the exhaust intakes, whereby the heated gases from said exhaust systems are introduced into said heating chamber at its opposide ends and flow toward a central portion thereof where they are discharged by said exhaust outlet thereby enhancing the even distribution of heat along the length of said further wall means serving as the heat transfer surface, said expansion chamber section defining an expansion chamber interposed in the intake manifold said internal combustion between the carburetor and said combustion chamber, and including a fuel/air mixture inlet connected in fluid communication with said intake manifold, and a fuel/air mixture outlet joined in fluid communication with said intake manifold at a location downstream from said fuel/air mixture, said expansion chamber section serving to direct a fuel/air mixture over said heat transfer surface defined by said further wall means for purposes of heating and expanding said mixture prior to its introduction into a combustion chamber of said internal combustion engine, such that vaporization is improved and hydrocarbons are more completely combusted, and a safety valve providing selective fluid communication between said expansion chamber and the ambient atmosphere, said safety valve serving to release pressure within said expansion chamber when said pressure exceeds a preselected value as during an engine backfire, and wherein said first wall means defines at least one portion for providing communication between said expansion chamber and the ambient atmosphere, and wherein said safety valve includes a closure member proportioned for closing said heating chamber section port, a spring member for biasing said closure member to its closed position over said heating chamber section port and a housng member engaging a portion of said spring member and serving to mount said spring member and said closure member proximate said expansion chamber section port, said housing member including an opening through which pressurized gases can be vented to the ambient atmosphere.

* * * * *